(12) United States Patent
Shih

(10) Patent No.: US 7,408,606 B2
(45) Date of Patent: Aug. 5, 2008

(54) LIQUID CRYSTAL DISPLAY PANEL

(75) Inventor: Po-Sheng Shih, Tao-Yuan Hsien (TW)

(73) Assignee: HannStar Display Corp., Taipei County (TW)

( * ) Notice: Subject to any disclaimer, the term of this patent is extended or adjusted under 35 U.S.C. 154(b) by 295 days.

(21) Appl. No.: 10/907,057

(22) Filed: Mar. 18, 2005

(65) Prior Publication Data

US 2006/0164585 A1   Jul. 27, 2006

(30) Foreign Application Priority Data

Jan. 27, 2005   (TW) .............................. 94102502 A

(51) Int. Cl.
  *G02F 1/1343* (2006.01)
  *G02F 1/1337* (2006.01)
(52) U.S. Cl. ....................... 349/129; 349/139
(58) Field of Classification Search ................. 349/129, 349/139
  See application file for complete search history.

(56) References Cited

U.S. PATENT DOCUMENTS

| | | | |
|---|---|---|---|
| 6,710,825 B2* | 3/2004 | Kubo et al. | 349/48 |
| 6,791,647 B1* | 9/2004 | Kim et al. | 349/129 |
| 6,985,197 B2* | 1/2006 | Chuang | 349/114 |
| 7,113,239 B2* | 9/2006 | Chin et al. | 349/129 |
| 2003/0112397 A1* | 6/2003 | Lee | 349/129 |
| 2005/0083479 A1* | 4/2005 | Okumura | 349/178 |

* cited by examiner

*Primary Examiner*—Michael H Caley
(74) *Attorney, Agent, or Firm*—Winston Hsu

(57) ABSTRACT

A liquid crystal display panel is disclosed, in which each sub-pixel electrode has an opening in the center and a patterned conductive layer as a bias electrode is positioned relatively around the sub-pixel electrode. Upon being applied with a voltage, the liquid crystal molecules above the sub-pixel around the opening will tilt down outwardly and radially. Upon being applied with a bias voltage, the liquid crystal molecules above the bias electrode will be arranged parallel to the substrate due to the effect from the electric field. The liquid crystal layer may further comprise a chiral dopant, such that the molecules twist when they tilt.

15 Claims, 10 Drawing Sheets

LIQUID CRYSTAL DISPLAY PANEL

BACKGROUND OF INVENTION

1. Field of the Invention

The present invention relates to a liquid crystal display (LCD) panel, particularly a vertical alignment (VA) liquid crystal display panel, which does not include a protrusion and is accordingly without a light leakage occurring at an edge of the protrusion.

2. Description of the Prior Art

LCD devices have been widely used in various electronic devices, such as mobile phones, personal digital assistants (PDA), notebooks, terminals, television sets, becoming a main display product in the market. However, the view angle of the conventional LCD is limited by the structure of the liquid crystal molecule and the optical character. Thus, it is necessary to develop a LCD with wider view angle, such as a vertical alignment liquid crystal display (VALCD) panel.

Please refer to FIG. 1, a schematic plan view of a conventional VALCD panel and a cross-sectional schematic diagram of the LCD panel along the line AA'. As shown in FIG. 1, a sub-pixel area 10 of a conventional VALCD panel includes a first substrate 12, a second substrate 14, a liquid crystal layer 16 filled between the first substrate 12 and the second substrate 14, a common electrode 18 positioned on the first substrate 12 on the side facing to the second substrate 14, a transparent electrode 20 disposed between the liquid crystal layer 16 and the second substrate 14, protrusions 22 disposed on the common electrode 18 on the side facing to the second substrate 14. The sub-pixel area is divided into multi-domains through the settlement of the protrusions 22. The liquid crystal molecules of each domain are aligned in various directions and rotate, respectively, increasing the view angle of VALCD panel 10.

As it is described in the above, although the conventional VALCD panel has wider view angle, due to the protrusions, some liquid crystal molecules slightly tilt without a voltage applied to. Therefore, a light leakage tends to occur at the position 24 or 26 beside the protrusions 22. Accordingly the contrast ratio for the display is decreased and the display performance is affected.

Please refer to FIG. 2, a schematic plan view of another conventional vertical alignment LCD panel which is a modification from the above-mentioned VALCD panel. A transparent conductive layer 32 having fine slits 34 and protrusions 36 are comprised. The alignment of liquid crystal is stable, but in the gray scale display, the display image is not uniform and irregular shapes appear. The pattern of such transparent conductive layer having fine slits is defined by photolithography. It is not easy to control the uniformity of the resist thickness during the manufacture, and accordingly the slit widths are not constant, such that an irregular shape of mura occurs when the display is operated. Furthermore, the liquid crystal arrangement at the edge of the pixel in the vicinity of data lines is not stable, due to the electric field from the data lines.

Therefore, a VALCD panel having a better structure is still needed to allow a stable liquid crystal arrangement and avoid light leakage and mura effect.

SUMMARY OF INVENTION

It is an object of the present invention to provide a LCD panel without protrusion while the liquid crystal molecules therein are aligned stably and problems of light leakage and mura are prevented.

According to the present invention, the LCD panel comprises a first substrate and a second substrate, a common electrode on the first substrate, a liquid crystal layer comprising liquid crystal molecules and interposed between the first substrate and the second substrate, a plurality of sub-pixel electrodes, and a plurality of patterned conductive layers. Each sub-pixel electrode is positioned on the second substrate and has an opening in the center. Each patterned conductive layer functions as a bias electrode and is positioned on the second substrate around the sub-pixel electrode. The sub-pixel electrode and the bias electrode do not contact to each other.

In a LCD panel in an embodiment according to the present invention, when the sub-pixel electrode is applied with a voltage, the liquid crystal molecules above the sub-pixel electrodes around the opening tilt down outwardly and radially. When the bias electrode is applied with a voltage, the liquid crystal molecules above the bias electrode are aligned to substantially parallel the second substrate.

In a LCD panel in another embodiment according to the present invention, the liquid crystal layer comprises liquid crystal molecules incorporated with a chiral dopant. Therefore, when the sub-pixel electrode is applied with a voltage, the liquid crystal molecules above the sub-pixel electrodes around the opening not only tilt down outwardly and radially, but also twist in a same way, clockwise or counter-clockwise. When the bias electrode is applied with a voltage, the liquid crystal molecules above the bias electrode are aligned to substantially parallel the second substrate.

The VALCD panel according to the present invention has a novel structure. A bias is used and the pixel electrode has an opening, such that the liquid crystal arrangement of the liquid crystal layer exists multi-domains, achieving a wide view angle effect. Furthermore, because protrusion is not used on the side of color filters of the LCD panel according to the present invention, the manufacturing process is simple and easy and a light leakage due to protrusion does not occur. Accordingly, light leakage is avoided and the display has a relatively high contrast ratio. In addition, a bias is used to change the alignment direction of liquid crystal to form a boundary and result a shielding effect to the electric field from the data lines. Such that, the liquid crystal molecules at the edge portion of the sub-pixel electrode are aligned stably, and accordingly touch mura effect is decreased.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIGS. 3-9; the VALCD panel according to the present invention is described in detail hereinafter.

Figure 1:
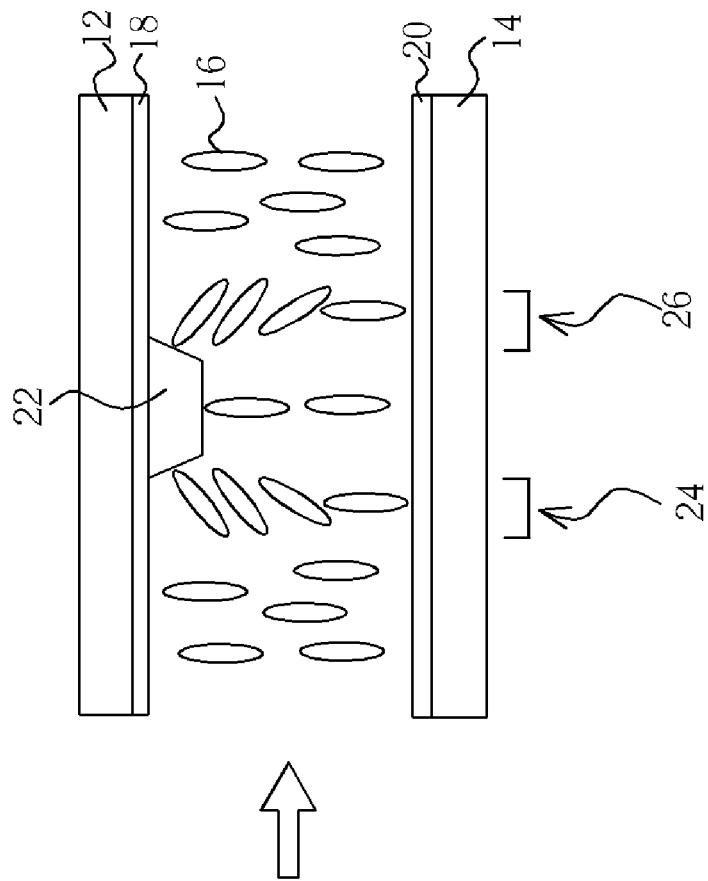
FIG. 1 is a schematic plan view of a conventional vertical alignment LCD panel and a cross-sectional schematic diagram of the LCD panel along the line AA'.
Figure 1:
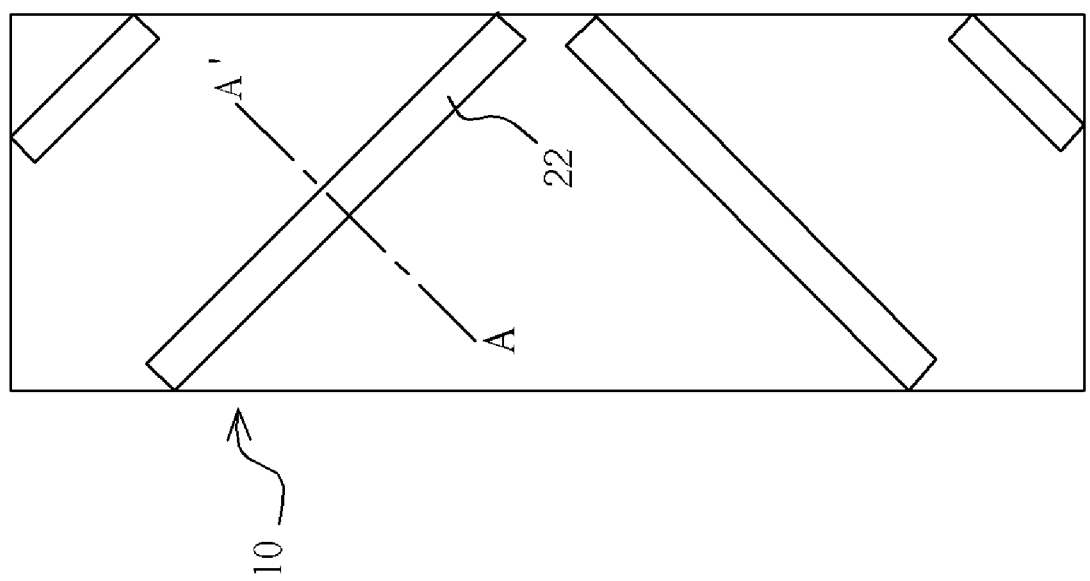
Figure 2:
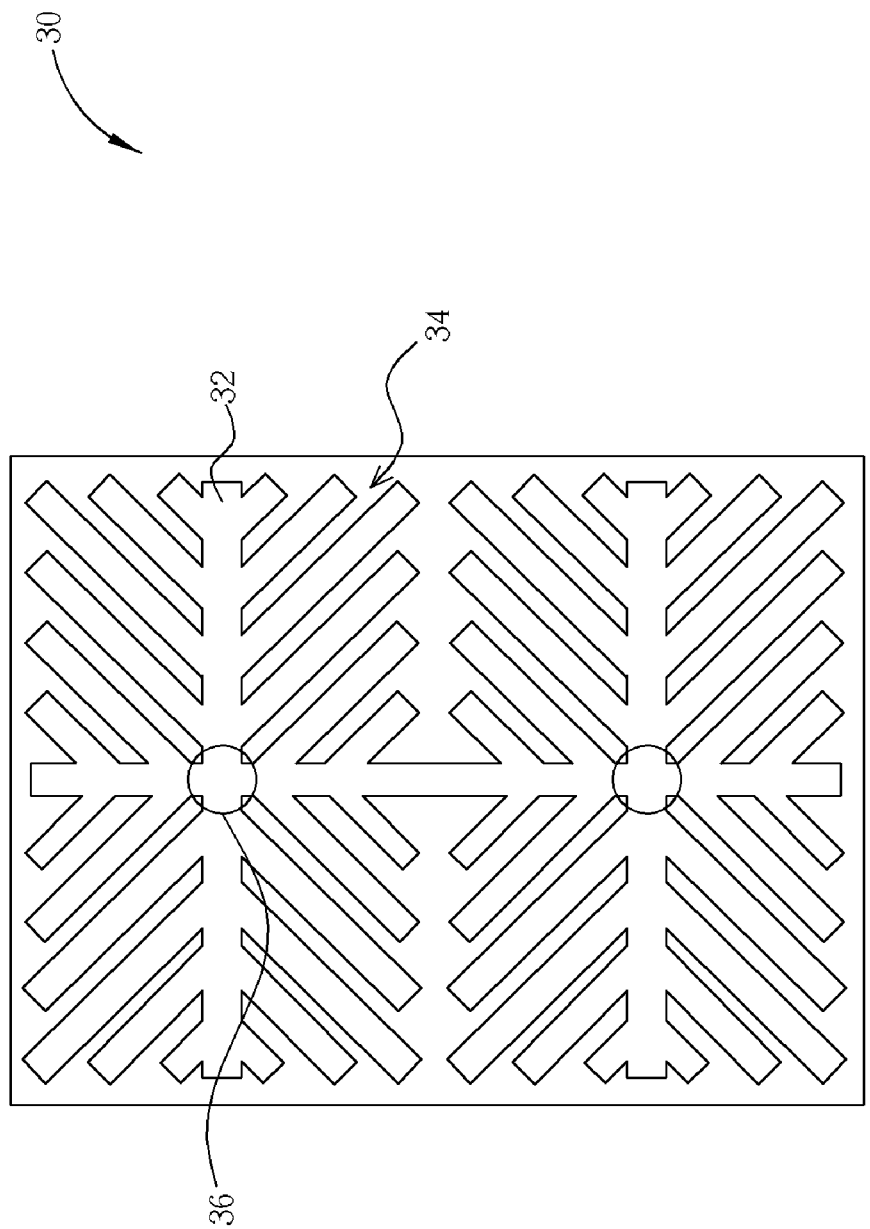
FIG. 2 is a schematic plan view of another conventional vertical alignment LCD panel.
Figure 3:
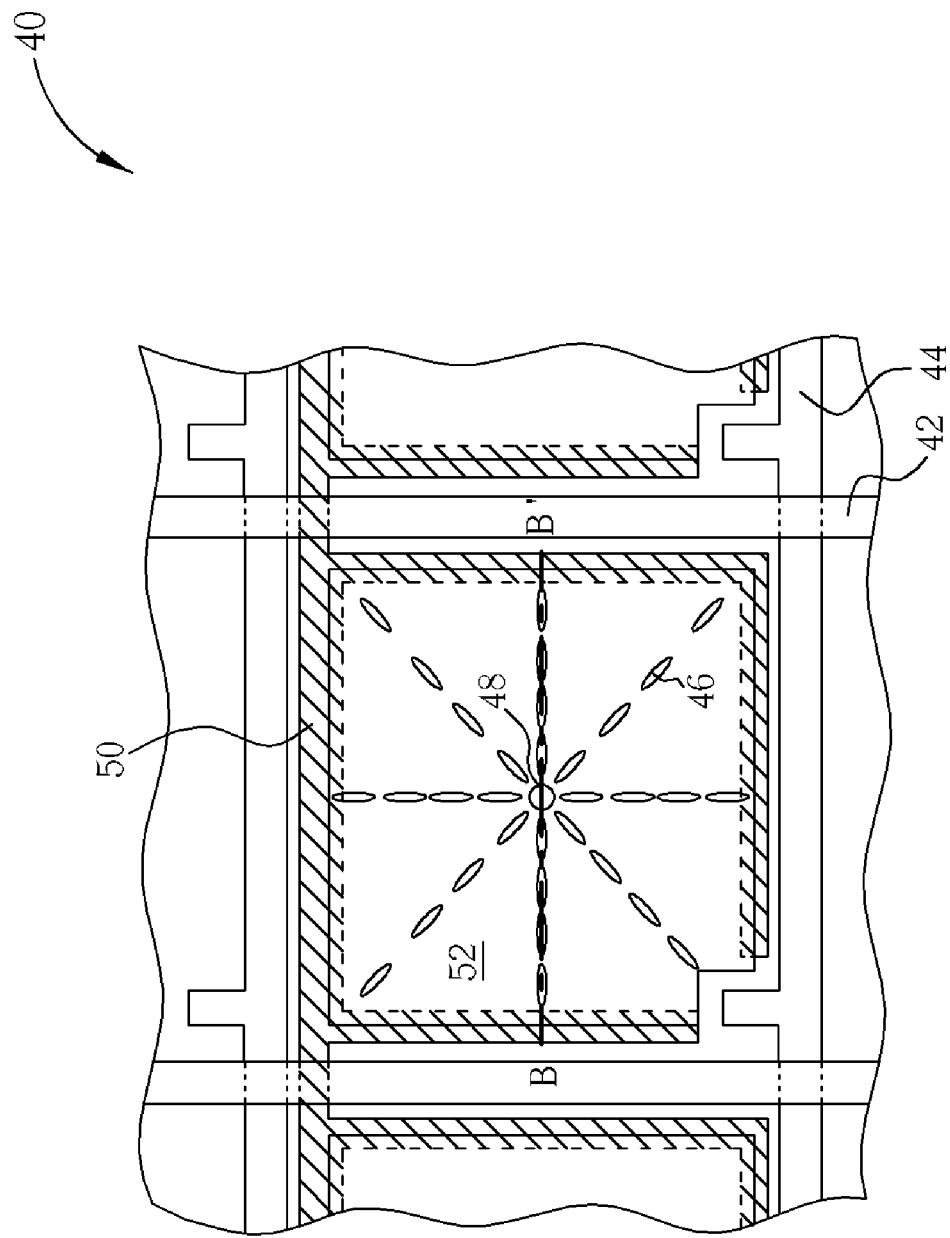
FIG. 3 is a schematic plan view of a LCD panel of one embodiment according to the present invention.
Figure 4:
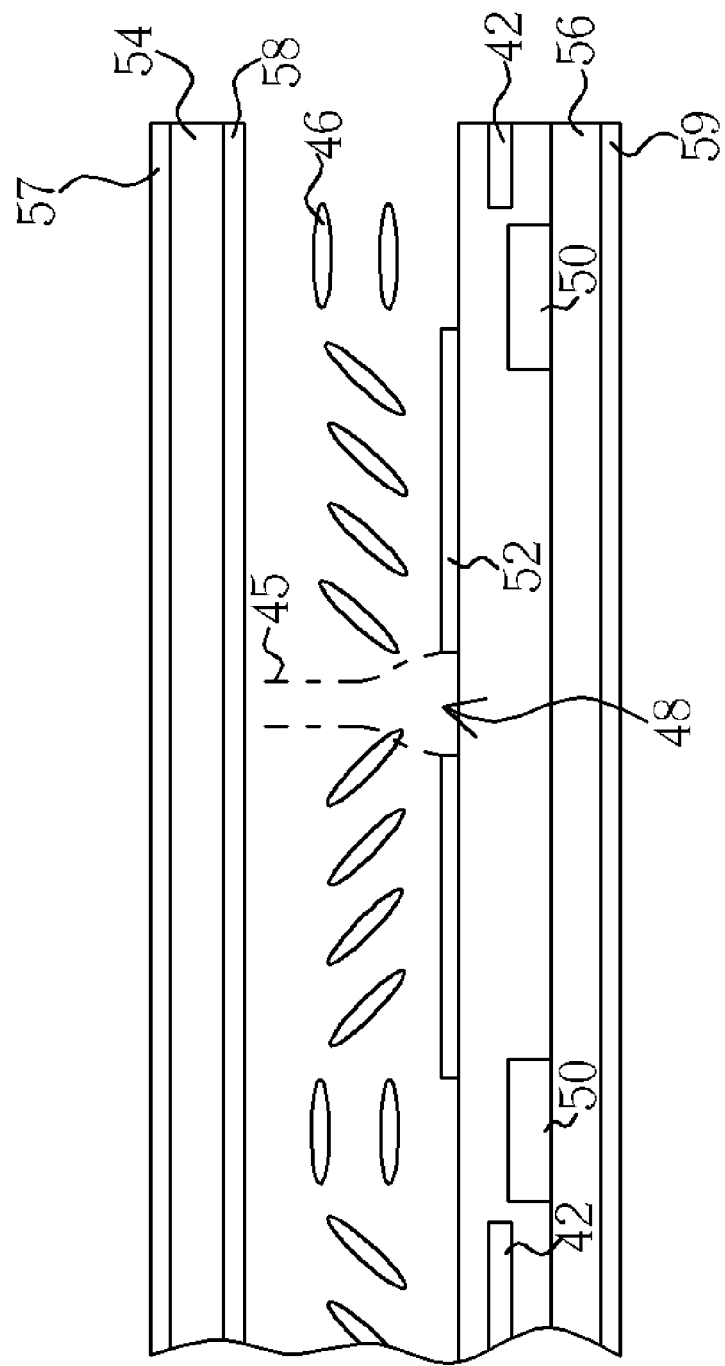
FIG. 4 is a cross-sectional schematic diagram of the LCD panel shown in FIG. 3 along the line BB'.

Please refer to FIG. 3 showing a schematic plan view of a LCD panel of one embodiment according to the present invention and FIG. 4 showing a cross-sectional schematic diagram of the LCD panel of FIG. 3 along the line BB'. The VALCD panel 40 according to the present invention comprises a first substrate 54 and a second substrate 56 disposed opposite each other. The material for substrate may be glass, quartz, or plastics. A common electrode 58 is disposed on the first substrate 54 on the side facing to the second substrate 56. A liquid crystal layer 46 comprising liquid crystal molecules is disposed between the common electrode 58 and the second substrate 56. A plurality of sub-pixel electrodes 52 are disposed between the surface of the second substrate at the side facing the first substrate 54 and the liquid crystal layer 46. Each sub-pixel electrode 52 has an opening 48 in the center. The sub-pixel electrode 52 may be a transparent electrode, such as indium tin oxide (ITO) transparent electrode. In case of a reflective display, the sub-pixel electrode 52 may be a light-reflective electrode. A patterned conductive layer as a bias electrode 50 is disposed on the second substrate 56 around the sub-pixel electrode 52, specifically disposed between the second substrate 56 and the sub-pixel electrode 52. Each sub-pixel electrode 52 relatively overlaps each bias electrode 50 only at the edge portion from a plan view, and the sub-pixel electrode and the bias electrode do not contact to each other.

In an initial state that the sub-pixel electrode 52 is not applied with a voltage, the liquid crystal molecules of the liquid crystal layer 46 above the sub-pixel electrode 52 are aligned in a direction perpendicular to the substrate (not shown). When a voltage is applied to the sub-pixel electrode 52, the liquid crystal molecules of the liquid crystal layer 46 above the sub-pixel electrode tilt due to the effect of electric field. Whereas each sub-pixel electrode 52 has the opening 48 in the center to create a fringe electric field effect, referring to the dot line 45 as shown in FIG. 4, liquid crystal molecules thus tilt down to the outward direction from the opening 48, that is, the liquid crystal molecules are aligned and tilt down in a direction toward to the surrounding bias electrode 50, as shown in FIGS. 3 and 4. A voltage is additionally applied to the bias electrode 50 to function as a bias. At this situation, the liquid crystal molecules above the bias electrode 50 change the tilt angle due to the bias and are aligned in a direction substantially parallel to the surface of the second substrate 56.

The voltage value of the bias is greater than the voltage applied to the sub-pixel electrode, such that the liquid crystal molecules of the liquid crystal layer 46 above the position surrounding the sub-pixel electrode 52 form a boundary. Therefore, the liquid crystal layer 46 are divided into multiple domains by the opening 48 of the sub-pixel electrode 52 and the bias electrode 50 around the sub-pixel electrode 52 in the VALCD panel according to the present invention.

Figure 5:
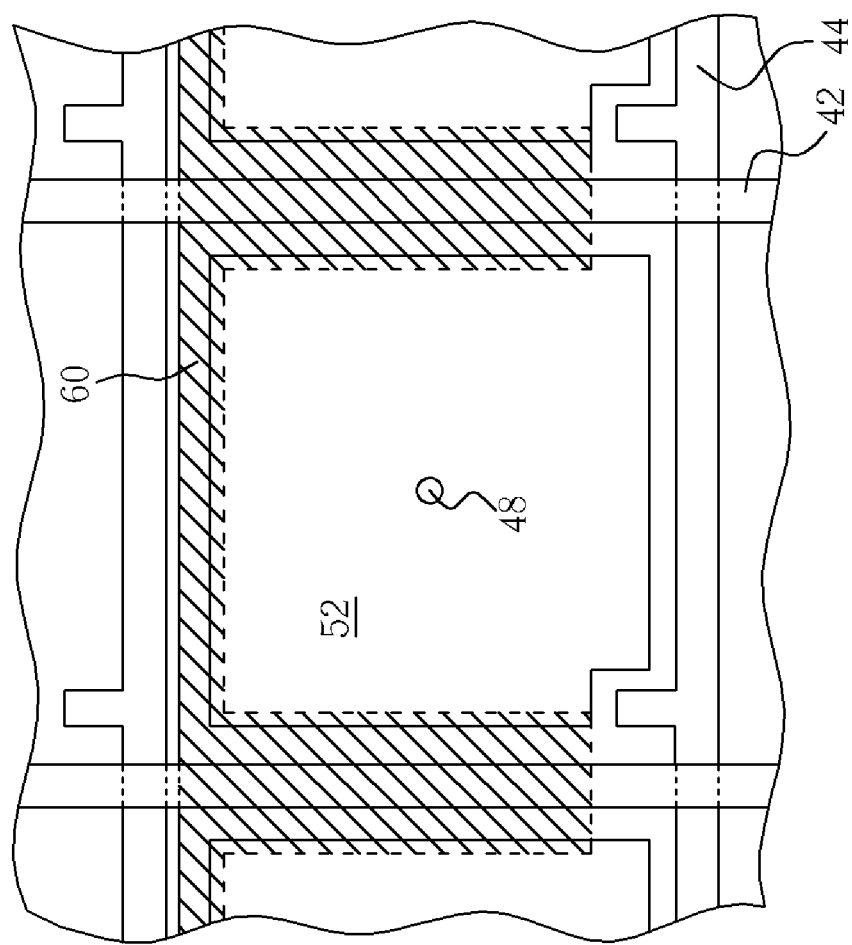
FIG. 5 is a schematic diagram showing an example of a comb-shaped bias electrode arranged in a pixel unit according to the present invention.

Because the bias electrode 50 is disposed at the position corresponding to the peripheral portion of the sub-pixel electrode 52, the pattern of the bias electrode 50 may be in a frame shape as shown in FIG. 3 or a comb shape as shown in FIG. 5. The frame-shaped bias electrodes 50 or comb-shaped bias electrodes 60 may be electrically connected to each other.

Figure 6:
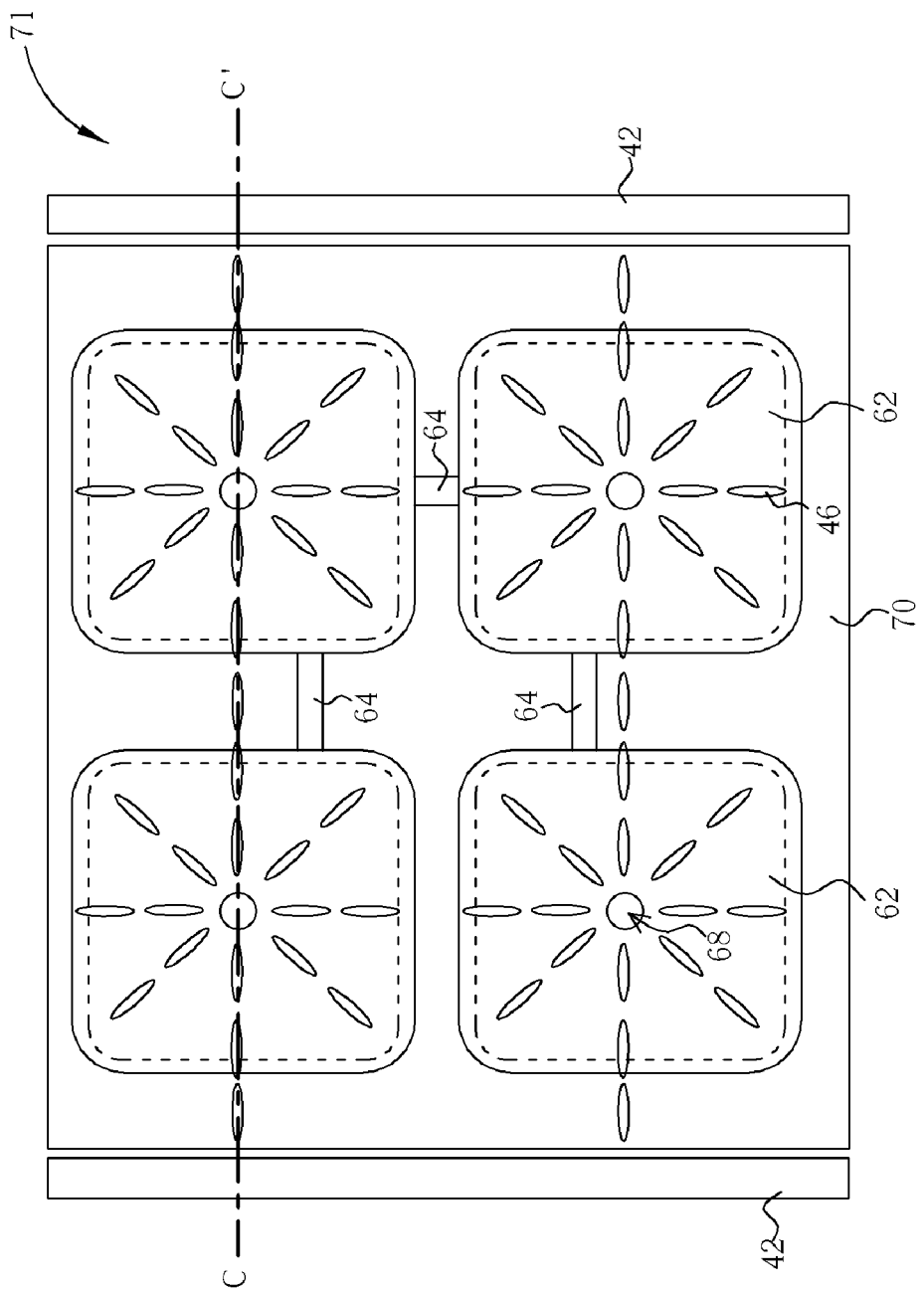
FIG. 6 is a schematic plan view of a LCD panel of another embodiment according to the present invention.
Figure 7:
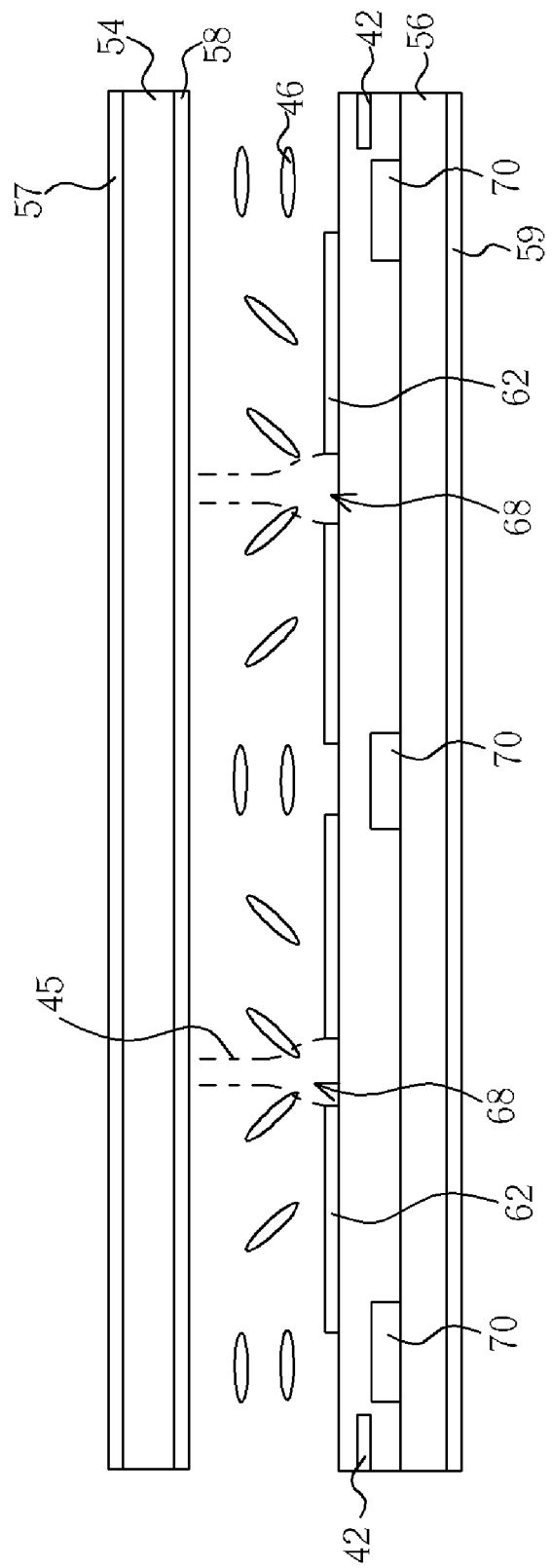
FIG. 7 is a cross-sectional schematic diagram of the LCD panel shown in FIG. 6 along the line CC'.

The above-mentioned each pixel unit of the LCD panel of the present invention includes a sub-pixel electrode. While, each pixel unit may include a plurality of sub-pixel electrodes. Please refer to FIGS. 6 and 7. FIG. 6 is a schematic plan view of a LCD panel of another embodiment according to the present invention. FIG. 7 is a cross-sectional schematic diagram of the LCD panel of FIG. 6 along the line CC'. A pixel unit 71 includes four sub-pixel electrodes 62, and each sub-pixel electrode 62 is electrically connected to each other through conductive wires 64. Each sub-pixel electrode 62 has an opening 68 in the center. Therefore, when the sub-pixel electrode 62 is applied with a voltage, the liquid crystal molecules of the liquid crystal layer around the opening 68 are aligned to tilt down outwardly and radially. The bias electrode 70 has a hollow portion corresponding to most portion of the sub-pixel electrode 62. Therefore, when the observer takes a plan view on the second substrate 56, the sub-pixel electrode 62 relatively overlaps the bias electrode 70 only at an edge portion, and the sub-pixel electrode 62 and the bias electrode 70 do not contact to each other.

Such configuration of the sub-pixel electrode 62 and the bias electrode 70 allows the liquid crystal of the liquid crystal layer above each sub-pixel electrode 62 to form a liquid crystal domain. In the periphery of the liquid crystal domain, another voltage, functioning as a bias, is applied to the liquid crystal above the bias electrode 70, such that the liquid crystal molecules are aligned substantially parallel to the second substrate 56. The bias is more than the voltage applied to the sub-pixel electrode. Therefore, a boundary is formed at the portion of the liquid crystal layer 46 above the surroundings of the sub-pixel electrode 62. Therefore, because the pixel unit 71 has the structure of a plurality of sub-pixel electrodes 62 and the bias electrode 70 at the surrounding above the sub-pixel electrodes 62, the liquid crystal layer 46 of the pixel unit 71 is divided into multiple domains and the liquid crystal in each domain is aligned stably, achieving a uniform wide view angle effect.

The edge portion of the sub-pixel electrode 62 relatively overlaps the bias electrode 70, but they do not contact to each other. When the display panel is operated, both of them need a different voltage, respectively, and cannot be electrically connected or short.

Please refer to FIGS. 3 to 9; the second substrate 56 may further comprise a plurality of data lines 42 and a plurality of gate lines 44 for the transmission of electrical signals to the sub-pixel electrode 52. In a general manufacturing process of LCD, the data lines 42 are disposed cross over the gate lines 44, and the area defined by two adjacent data lines and two adjacent gate lines is a pixel unit.

The bias electrodes and the data lines may be manufactured simultaneously from a second metal layer, or the bias electrodes and the gate lines may be manufactured simultaneously from a first metal layer. In a preferred manufacturing process, the first metal layer is deposited on the surface of the second substrate. Next, gate lines and bias electrodes are defined simultaneously from the first metal layer. Subsequently, an insulation layer is deposited to cover the gate lines and the bias electrodes. Then, a second metal layer is deposited and data lines are defined from the second metal layer. A protection layer is deposited to cover the data lines. Finally, a sub-pixel electrode material is deposited on the protection layer and patterned to form sub-pixel electrodes. The space between the bias electrode and the data line is relatively plenty in this process.

In an alternative manufacturing process, bias electrodes and data lines are formed simultaneously. The first metal layer is deposited on the surface of the second substrate. Next, gate lines are defined from the first metal layer. Subsequently, an insulation layer is deposited to cover the gate lines. Then, a second metal layer is deposited on the insulation layer and bias electrodes and data lines are defined from the second metal layer. A protection layer is deposited to cover the data lines and the bias electrodes, both not contacting to each other. Finally, a sub-pixel electrode material is deposited on the protection layer and patterned to form sub-pixel electrodes.

The liquid crystal display panel according to the present invention may further comprises a polarizer 57 on the outer side of the first substrate 54, and another polarizer 59 on the outer side of the second substrate 56. The polarizer may be a circularly polarizer, such as a circularly polarizer composed of a linear polarizer and a quarter wave plate. A relatively high transmittance may be obtained using a circularly polarizer.

Figure 8:
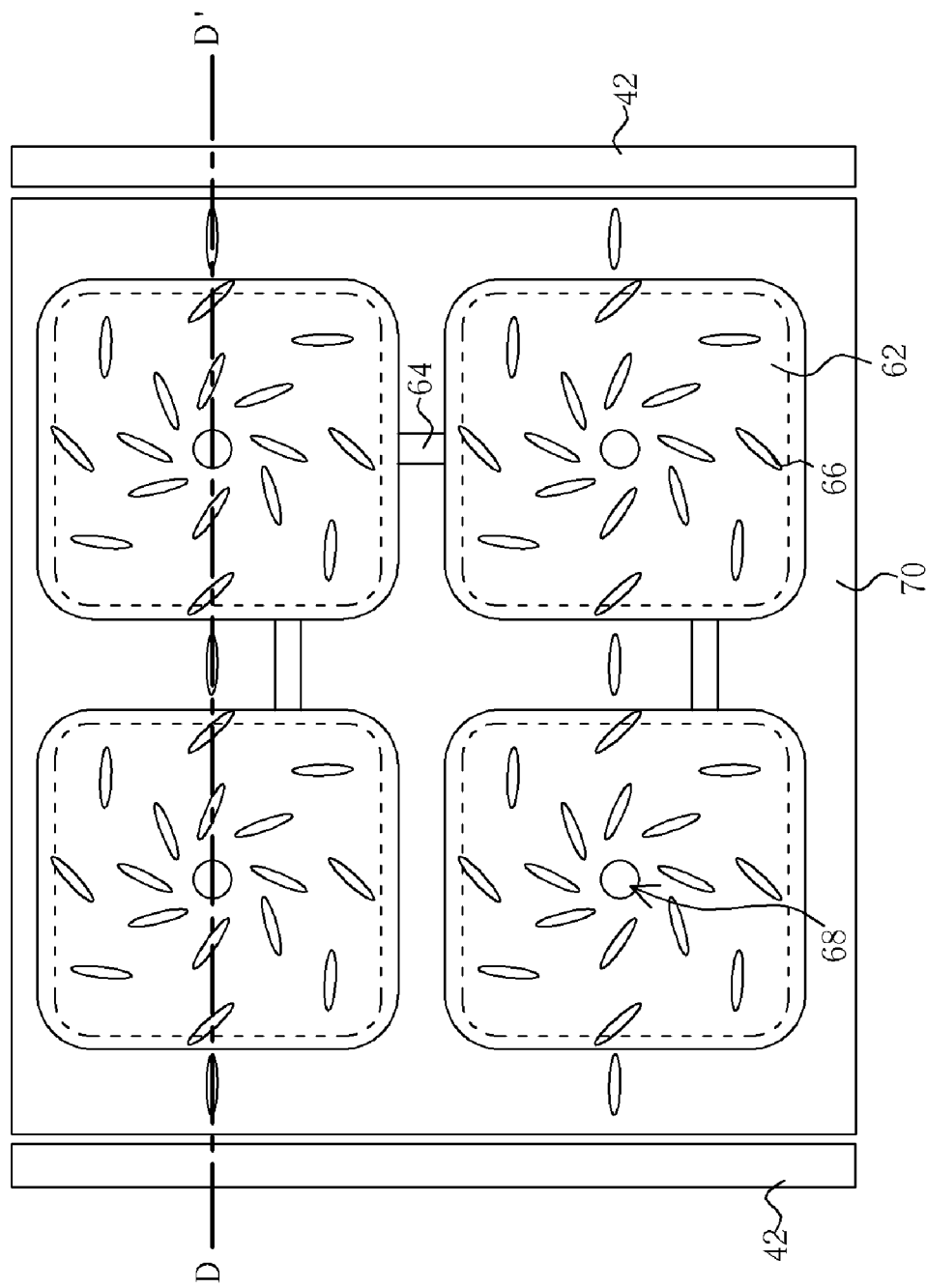
FIG. 8 is a schematic plan view of a LCD panel of still another embodiment according to the present invention.
Figure 9:
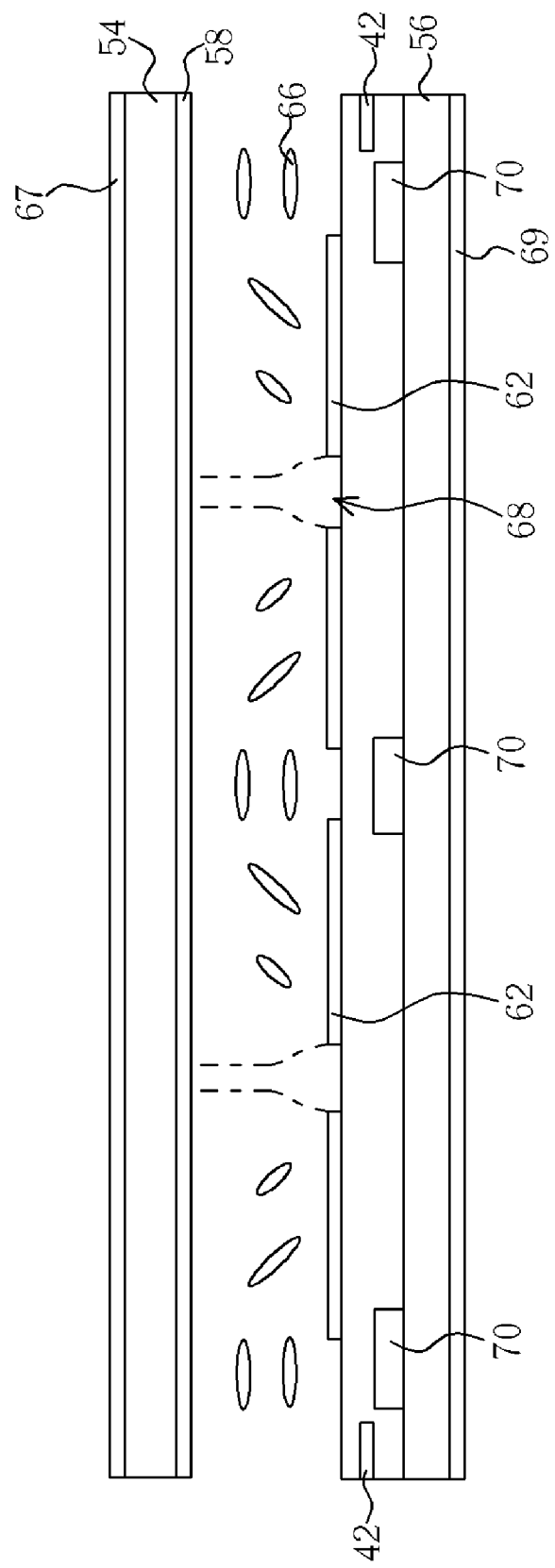
FIG. 9 is a cross-sectional schematic diagram of the LCD panel shown in FIG. 8 along the line DD'.

Please refer to FIGS. 8 and 9. In another aspect of the liquid crystal display panel according to the present invention, the liquid crystal layer 66 may comprises liquid crystal molecules and a chiral dopant incorporated into the liquid crystal molecules. Therefore, when the sub-pixel electrode 62 is applied with a voltage, the liquid crystal molecules of the liquid crystal layer 66 above the sub-pixel electrode 62 tilt down due to the electric field effect. Because each sub-pixel electrode 62 has an opening 68 in the center, the tilt direction of the liquid crystal molecules is radial, that is, from the opening 68 as a center to the outward. Furthermore, because the liquid crystal molecules are incorporated with a chiral dopant, the liquid crystal molecules not only tilt down radially but also twist clockwise or counter-clockwise, forming a continuous pinwheel alignment (CPA) as shown in FIGS. 8 and 9. Meanwhile, a voltage as a bias is applied to the bias electrode 70, the liquid crystal molecules above the bias electrode 70 change the tilt angle and are aligned to substantially parallel the second substrate 56, due to the bias effect. Therefore, a liquid crystal layer having multiple domains is formed, and the resulting display panel has a wide view angle.

Similarly, a polarizer 67 may be further disposed on the outer side of the first substrate 54, and a polarizer 69 may be further disposed on the outer side of the second substrate 56. In one embodiment, the polarizer may be a circularly polarizer or a linear polarizer. The transmittance is higher for using a circularly polarizer than a linear polarizer, but the transmittance is already enough when a linear polarizer is used.

Figure 10:
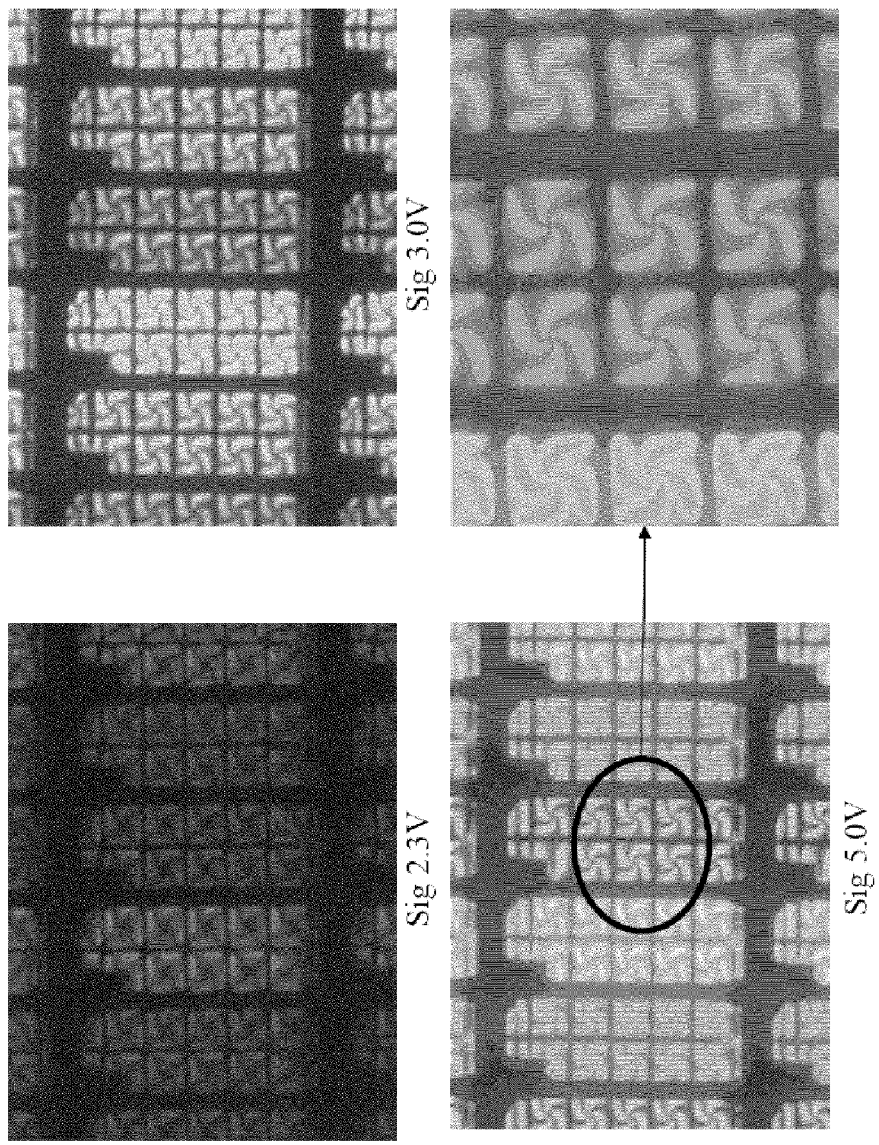
FIG. 10 shows micrographs of LCD panels from three examples according to the present invention.

The vertical alignment liquid crystal display panel according to the present invention can be suitable for the twist nematic (TN) liquid crystal display. In the present invention, the wide view angle effect is achieved by the multi-domains of the liquid crystal layer formed in virtue of the bias and the opening in the center of the sub-pixel electrode. The manufacturing process of the present invention is simple in comparison with a LCD panel having a structure comprising protrusions. Because protrusion is not used in the present invention, a light leakage due to protrusion does not occur. Accordingly, the display according to the present invention has a relatively high contrast ratio. In addition, a bias is used to change the alignment direction of liquid crystal, forming a boundary and having a shielding effect to the electric field from the data lines. Such that, the liquid crystal at the edge portion of the sub-pixel electrode has a stable alignment, and accordingly touch mura effect is decreased. FIG. 10 shows the results from three embodiments according to the present invention. The micrographs shown in FIG. 10 are a part of sub-pixel electrode in a liquid crystal display panels driven by a signal voltage of 2.3, 3.0, and 5.0 volts, denoted as Sig 2.3V, Sig 3.0V, and Sig 5.0V, respectively. The voltage applied to the common electrode is 0 volt. The bias is 14 volts. The liquid crystal layer is incorporated with a chiral dopant. 45-degree linear polarizers are used. The display performance is excellent as shown in FIG. 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display panel, comprising:
   a first substrate and a second substrate;
   a plurality of gate lines and a plurality of data lines on the second substrate, wherein two adjacent gate lines and two adjacent data lines define a pixel unit comprising a plurality of sub-pixel electrodes each having a circular opening formed only in its center and the sub-pixel electrodes are electrically connected to each other;
   a common electric electrode on the first substrate;
   a liquid crystal layer comprising liquid crystal molecules and interposed between the first substrate and the second substrate; and
   a plurality of patterned conductive layers as a bias electrode positioned on the second substrate around the sub-pixel electrode.

2. The liquid crystal display panel of claim 1, wherein the bias electrodes and the gate lines are formed from a same metal layer.

3. The liquid crystal display panel of claim 1, wherein the bias electrodes and the data lines are formed from a same metal layer.

4. The liquid crystal display panel of claim 1, wherein when the sub-pixel electrodes are applied with a first voltage, the liquid crystal molecules above the sub-pixel electrodes around the opening tilt down outwardly and radially.

5. The liquid crystal display panel of claim 1, wherein when the bias electrodes are applied with a second voltage, the liquid crystal molecules above the bias electrodes are aligned to parallel the substrate.

6. The liquid crystal display panel of claim 1, further comprising a first polarizer on the outer side of the first substrate and a second polarizer on the outer side of the second substrate.

7. The liquid crystal display panel of claim 6, wherein the first polarizer and the second polarizer are circular polarizers.

8. The liquid crystal display panel of claim 6, wherein the first polarizer and the second polarizer each comprise a linear polarizer and a quarter wave plate.

9. The liquid crystal display panel of claim 1, wherein the sub-pixel electrodes are indium tin oxide (ITO) transparent electrodes.

10. The liquid crystal display panel of claim 1, wherein the liquid crystal display panel is a vertical alignment liquid crystal display panel.

11. The liquid crystal display panel of claim 1, wherein the liquid crystal layer is incorporated with a chiral dopant.

12. The liquid crystal display panel of claim 1, wherein when the sub-pixel electrodes are applied with a first voltage, the liquid crystal molecules above the sub-pixel electrodes around the opening tilt down outwardly and radially and twist in a same direction of clockwise or counter-clockwise.

13. The liquid crystal display panel of claim 1, further comprising an insulating layer positioned between the sub-pixel electrodes and the bias electrodes.

14. The liquid crystal display panel of claim 1, wherein the plurality of bias electrodes are positioned between the sub-pixel electrodes and the second substrate.

15. The liquid crystal display panel of claim 1, wherein an edge portion of each sub-pixel electrode respectively overlaps an edge portion of each bias electrode.

* * * * *